United States Patent [19]

Thaler et al.

[11] Patent Number: 5,053,780
[45] Date of Patent: Oct. 1, 1991

[54] RESPONSIVE SIMULTANEOUS FREQUENCY AGILE RADAR

[75] Inventors: Samuel Thaler, Encino; Gordon M. Johnsen, West Hills, both of Calif.

[73] Assignee: Hughes Aircraft Company, Los Angeles, Calif.

[21] Appl. No.: 366,816

[22] Filed: Jun. 14, 1989

[51] Int. Cl.$^5$ .............................................. G01S 7/282
[52] U.S. Cl. ..................................... 342/200; 342/129
[58] Field of Search ...................... 342/129, 200, 195; 331/10, 12

[56] References Cited

U.S. PATENT DOCUMENTS

| | | | |
|---|---|---|---|
| 3,961,172 | 6/1976 | Hutcheon | 235/181 |
| 4,158,842 | 6/1979 | Clemens et al. | 342/16 |
| 4,342,119 | 7/1982 | Seidl | 455/1 |
| 4,504,833 | 3/1985 | Fowler et al. | 367/14 X |
| 4,521,779 | 6/1985 | Lewis | 342/194 |
| 4,566,011 | 1/1986 | Lewis et al. | 342/201 |
| 4,853,701 | 8/1989 | Drabowitch | 342/139 |
| 4,983,978 | 1/1991 | Levinson | 342/200 |

Primary Examiner—John B. Sotomayor
Attorney, Agent, or Firm—R. M. Heald; C. D. Brown; W. K. Denson-Low

[57] ABSTRACT

A system for transmitting a comb of radar signals. The invention includes a phase shifter for shifting the phase of an input carrier signal. A frequency modulation signal is adjusted in amplitude by an attenuator 16 and input to a balanced mixer 14. The balanced mixer 14 mixes the input carrier signal with the attenuated frequency modulation signal. A summer 20 combines the output of the phase shifter 12 with the output of the balanced mixer 14. The system 10 of the present invention provides an inexpensive means of generating and receiving a complex of illuminating signals having a spread spectrum consisting of lines (teeth) of carrier frequencies with controllable power. The system 10 is agile in that the power levels and the spectral positions of the teeth may be varied.

4 Claims, 2 Drawing Sheets

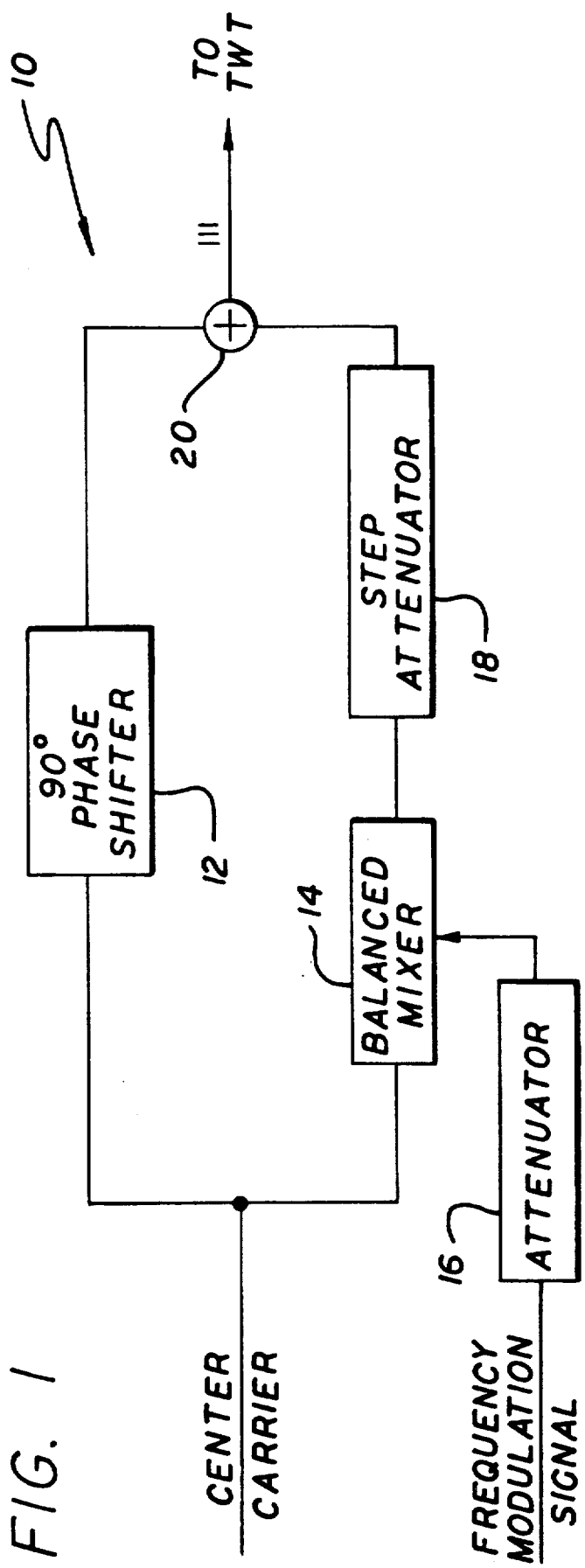

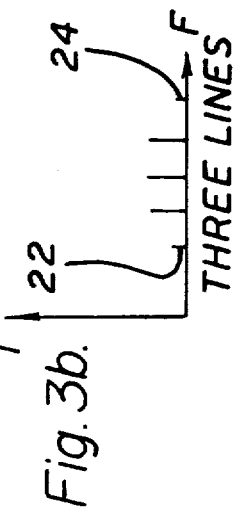
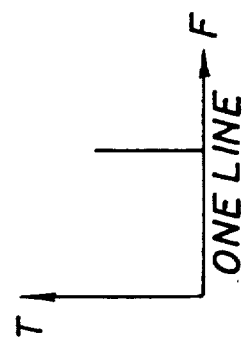
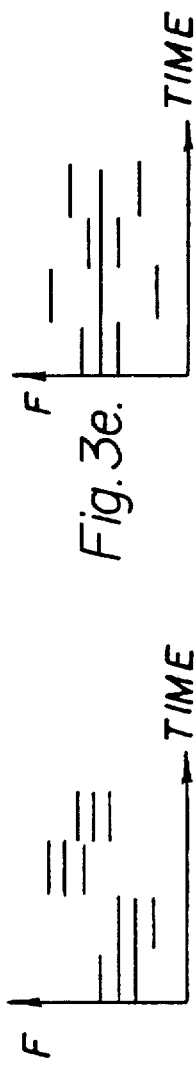
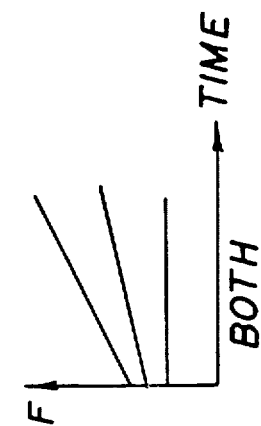
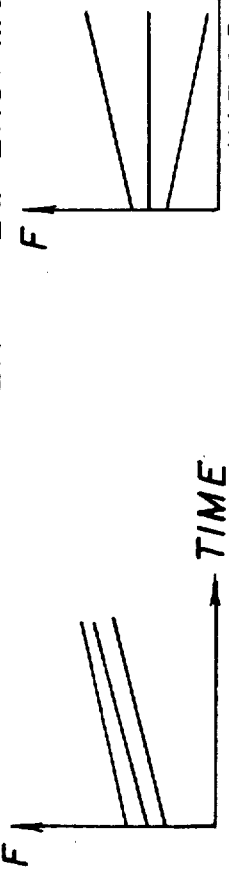
POWER SPECTRA
Fig. 3a. ONE LINE
Fig. 3b. THREE LINES
CARRIER FREQUENCY AGILITY
Fig. 3c. ONE LINE
Fig. 3d. THREE LINES
LINE SEPARATION AGILITY
Fig. 3e. THREE LINES
LINEAR FREQUENCY MODULATION
Fig. 3f. CARRIER
Fig. 3g. LINE SPACE
Fig. 3h. BOTH

RESPONSIVE SIMULTANEOUS FREQUENCY AGILE RADAR

BACKGROUND OF THE INVENTION

1. Field of the Invention

The present invention relates to radar and communication systems. More specifically, the present invention relates to radar and communication systems that are adapted to circumvent interference.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Conventional radar systems operate over a narrow band at a single carrier frequency. As a result, these systems were susceptible to interference. Many schemes have been developed to address this problem, two of which are the frequency hopping and spread spectrum schemes. Frequency hopping involves the transmission of a block of data at one carrier frequency, then "hopping" to another carrier frequency and transmitting another block of data and so on.

Unfortunately, when frequency hopping is employed, it is difficult, if not impossible to coherently add individual pulses together to improve the signal-to-noise ratio. While slow hopping may preserve the (phase) coherency of the pulses, slow hopping is considerably more susceptible to interference.

Conventional spread spectrum systems operate at a single carrier over a wide bandwidth. However, these systems create many intermodulation products. Thus, a considerable amount of power may be wasted in spurious sidebands. In addition, the coherency of the signals is uncertain.

Further, neither the conventional frequency hopping schemes nor the conventional spread spectrum schemes fully exploit the wide bandwidth capabilities of current traveling wave tube amplifiers.

Thus, a need exists in the art for a radar transmitter which is secure from interference, offers the performance advantages of phase coherency, is power efficient and is capable of taking advantage of the broad bandwidth of current traveling wave tube amplifiers.

SUMMARY OF THE INVENTION

The need in the art is addressed by the present invention which provides a system for transmitting a comb of radar signals. The invention includes a phase shifter for shifting the phase of an input carrier signal. A frequency modulation signal is adjusted in amplitude by an attenuator and input to a balanced mixer. The balanced mixer mixes the input carrier signal with the attenuated frequency modulation signal. A summer combines the output of the phase shifter with the output of the balanced mixer. The system of the present invention provides an inexpensive means of generating and receiving a complex of illuminating signals having a spread spectrum consisting of lines (teeth) of carrier frequencies with controllable power. The system is agile in that the power levels and the spectral positins of the teeth may be varied.

BRIEF DESCRIPTION OF THE DRAWINGS

FIG. 1 is a simplified illustrative implementation of the system of the present invention.

FIG. 2a is a power spectra showing that the three frequency bands output by the system of the illustrative embodiment may be of equal power.

FIG. 2b is a power spectrum showing the three frequencies generated by the present invention with more power allocated to the center frequency and correspondingly less power allocated to the two sidebands.

FIG. 3a shows a one-line power spectra.

FIG. 3b shows the three line power spectra provided by the system of the present invention.

FIG. 3c is a graph of frequency versus time showing how the frequency of a one line carrier can be varied over time.

FIG. 3d is a graph of frequency versus time showing how the frequency of the three line power spectra, of the present invention, can be varied with time.

FIG. 3e is a graph of frequency versus time showing how the frequency of the sidebands might be varied over time with respect to a center carrier frequency which has a constant frequency.

FIG. 3f is a graph of frequency versus time showing the result of sweeping the sidebands and the carrier frequency simultaneously.

FIG. 3g is a graph of frequency versus time showing the result of sweeping the sidebands only.

FIG. 3h is a graph of frequency versus time showing the result of sweeping the carrier and the upper sideband only.

DESCRIPTION OF THE INVENTION

Illustrative embodiments and exemplary applications will now be described with reference to the accompanying drawings.

A simplified illustrative implementation of the system 10 of the present invention is provided in FIG. 1. The system 10 includes a 90 degree phase shifter 12, a balanced mixer 14, a first attenuator 16, a second attenuator 18 and a summer 20. An input carrier signal from an exciter (basic oscillator) or frequency reference unit (FRU) is input to the 90 degree phase shifter 12 and the balanced mixer 14. The phase shifter 12 shifts the phase of the input carrier signal and produces the center line of the output signal. The balanced mixer 14 suppresses the carrier signal and generates first and second sidebands. While two sidebands, three lines total, are probably optimum, those skilled in the art will recognize that more than two sidebands can be produced without departing from the scope of the present invention.

The balanced mixer 14 receives a frequency modulated (FM) signal through the first attenuator 16. A particularly novel aspect of the present invention is that the modulation index of the balanced mixer is controlled by the input FM signal. The modulation index of the balanced mixer 14 determines the spectral position of the sidebands produced by the balanced mixer 14. The first attenuator 16 provides coarse control of the relative amplitude of the sidebands produced by the balanced mixer. The output of the balanced mixer 14 is input to the second attenuator 18. Shown as a step attenuator, the second attenuator 18 provides fine control of the amplitude of the sidebands.

The summer combines the sidebands from the attenuator 18 with the phase shifted carrier from the phase shifter 12. The 90 degree phase shifting of the input carrier is effective to allow the sidebands to be summed with carrier without cancellation and with minimum spurious outband products. The spectral output of the summer 20 is a multiple frequency radar comb which approximates an FM signal. As shown in FIG. 1, the center line of the output signal is the phase shifted carrier and the left and right lines are the sidebands. The attenuators 16 and 18 are designed to provide sidebands of amplitudes which equal the amplitude of the center carrier. Thus, a significant feature of the present invention resides in the ability to control the allocation of available power between a number of simultaneously employed frequencies. This is illustrated in FIGS. 2a and 2b. FIG. 2a shows that the three frequency bands output by the system of the illustrative embodiment may be of equal power. FIG. 2b shows the three frequencies with more power allocated to the center frequency and correspondingly less power allocated to the two sidebands.

In sum, the system 10 generates two sidebands from the carrier, phase shifts the sidebands and injects the sidebands into the carrier to provide a carrier with two sidebands instead of the single center carrier. The system 10 generates the desired frequency spectrum at low power levels. The output of the summer 20 is input to a traveling wave tube (TWT) not shown.

FIG. 3 illustrates the waveform flexibility afforded by the system of the present invention over a conventional system. With respect power spectra, FIG. 3a shows a one-line power spectrum while FIG. 3b shows the three line power spectrum provided by the system of the present invention. FIG. 3b shows that some power may be generated in spurious sidebands 22 and 24. However, judicious control of the modulation index should be effective to mitigate the production of such outbands.

With respect to carrier frequency agility, FIG. 3c shows how the frequency of a one line carrier can be varied over time, while FIG. 3d how the frequency of the three line power spectrum, of the present invention, can be varied with time.

FIG. 3e demonstrates line separation agility by showing how the frequency of the sidebands might be varied over time with respect to a center carrier frequency which has a constant frequency.

FIGS. 3f, 3g and 3h show FM modulation of the carrier frequency, variable sideband spacing and simultaneous variation of both parameters, respectively. That is, these figures show that the system of the present invention allows the sidebands and the carrier frequencies to be swept in frequency. Thus, FIG. 3f shows the result of sweeping the sidebands and the carrier frequency simultaneously. This is achieved by sweeping the input carrier frequency. Often referred to as "linear frequency modulation", FIG. 3g shows the result of sweeping the sidebands only. This is achieved by sweeping the FM signal input to the balanced mixer 14. FIG. 3h shows the result of sweeping the carrier and the upper sideband only.

Thus, the present invention provides multiple bands which may be powered, swept or hopped independently.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A device for transmitting a comb of radar signals, comprising:

a frequency source for generating an input carrier signal;

means for splitting said input carrier signal into first and second portions;

phase shifter means for shifting the phase of said first portion of said input carrier signal, to thereby produce a first output signal which comprises a phase-shifted version of said input carrier signal;

means for generating an input frequency modulation signal;

balanced mixer means for mixing said second portion of said input carrier signal with said input frequency modulation signal, to thereby produce a second output signal which comprises at least first and second sidebands of said input carrier signal, the spectral position of said first and second sidebands being controllable by said input frequency modulation signal;

first attenuator means for adjusting the amplitude of said input frequency modulation signal, to thereby provide a firs level of control of the relative amplitude of said first and second sidebands; and, summing means for combining said first output signal and said second output signal, to thereby produce a multiple frequency device output signal having a center carrier frequency and first and second sideband frequencies.

2. The device as set forth in claim 1, further comprising second attenuator means for adjusting the amplitude of said second output signal, to thereby provide a second level of control of the relative amplitude of said first and second sidebands.

3. The device as set forth in claim 2, wherein said phase shifter means includes a 90 degree phase shifter.

4. A method for transmitting a comb of radar signals including the steps of:

splitting an input carrier signal into first and second portions;

shifting the phase of said first portion of said input carrier signal to produce a phase-shifted first output signal;

mixing said second portion of said input carrier signal with a frequency modulation signal to produce a second output signal having first and second sidebands of said input carrier signal, the spectral portion of said first and second sidebands controllable by said frequency modulation signal;

attenuating the amplitude of said input frequency modulation signal to control the relative amplitude of said first and second sidebands; and combining said first and second output signals to produce a multiple frequency device output signal having a center carrier frequency and first and second sideband frequencies.

* * * * *